United States Patent
Nilsson

(10) Patent No.: US 12,051,950 B2
(45) Date of Patent: Jul. 30, 2024

(54) ELECTRICAL MOTOR

(71) Applicant: BorgWarner Sweden AB, Landskrona (SE)

(72) Inventor: Kristoffer Nilsson, Lund (SE)

(73) Assignee: BORGWARNER SWEDEN AB (SE)

(*) Notice: Subject to any disclaimer, the term of this patent is extended or adjusted under 35 U.S.C. 154(b) by 141 days.

(21) Appl. No.: 16/964,876

(22) PCT Filed: Jan. 25, 2019

(86) PCT No.: PCT/EP2019/051831
§ 371 (c)(1),
(2) Date: Jul. 24, 2020

(87) PCT Pub. No.: WO2019/145464
PCT Pub. Date: Aug. 1, 2019

(65) Prior Publication Data
US 2021/0036567 A1 Feb. 4, 2021

(30) Foreign Application Priority Data

Jan. 26, 2018 (SE) .................................. 1850091-8

(51) Int. Cl.
| | |
|---|---|
| *H02K 3/22* | (2006.01) |
| *B23P 19/02* | (2006.01) |
| *H02K 3/24* | (2006.01) |
| *H02K 3/50* | (2006.01) |
| *H02K 9/197* | (2006.01) |
| *H02K 11/30* | (2016.01) |
| *H02K 15/04* | (2006.01) |

(52) U.S. Cl.
CPC ................ *H02K 3/22* (2013.01); *B23P 19/02* (2013.01); *H02K 3/24* (2013.01); *H02K 3/50* (2013.01); *H02K 9/197* (2013.01); *H02K 11/30* (2016.01); *H02K 15/0492* (2013.01)

(58) Field of Classification Search
CPC .. H02K 3/22; H02K 3/50; H02K 3/24; H02K 1/20; H02K 9/19; H02K 11/30; H02K 15/0492; B23P 19/02
See application file for complete search history.

(56) References Cited

U.S. PATENT DOCUMENTS

| | | | |
|---|---|---|---|
| 3,254,246 A | 5/1966 | Philofsky et al. | |
| 4,115,915 A | * 9/1978 | Godfrey | ................ H02K 3/505 310/71 |

(Continued)

FOREIGN PATENT DOCUMENTS

| | | |
|---|---|---|
| DE | 102015012914 A1 | 4/2017 |
| EP | 2680405 A2 | 1/2014 |

(Continued)

OTHER PUBLICATIONS

International Search Report mailed Apr. 17, 2019, International Application No. PCT/EP2019/051831.

*Primary Examiner* — Leda T Pham
(74) *Attorney, Agent, or Firm* — Dilworth IP, LLC

(57) ABSTRACT

An electrical motor is provided, comprising a rotor (2), a stator (3), and a housing (4) enclosing the rotor (2) and the stator (3). The stator (3) comprises at least one end turn connection device (6) arranged on one axial end thereof, and a plurality of hollow winding pins (5) extending through the at least one end turn connection device (6).

12 Claims, 2 Drawing Sheets

(56) References Cited

U.S. PATENT DOCUMENTS

| | | | | |
|---|---|---|---|---|
| 5,068,607 | A * | 11/1991 | Redlich | G01B 7/02 |
| | | | | 324/207.16 |
| 5,939,806 | A * | 8/1999 | Kim | H02K 5/203 |
| | | | | 310/58 |
| 6,288,460 | B1 * | 9/2001 | Fakult | B60L 3/0061 |
| | | | | 310/58 |
| 6,313,556 | B1 | 11/2001 | Dombrovski et al. | |
| 10,630,127 | B1 * | 4/2020 | Thomasson | H02K 9/197 |
| 2007/0024132 | A1 * | 2/2007 | Salamah | F03D 80/60 |
| | | | | 290/55 |
| 2011/0309695 | A1 | 12/2011 | Huard | |
| 2013/0200743 | A1 * | 8/2013 | Okimitsu | H02K 3/12 |
| | | | | 310/201 |
| 2014/0139057 | A1 * | 5/2014 | Ho | H02K 1/148 |
| | | | | 310/54 |
| 2020/0227969 | A1 * | 7/2020 | Xu | H01R 43/0228 |

FOREIGN PATENT DOCUMENTS

| | | |
|---|---|---|
| EP | 3176916 A1 | 6/2017 |
| JP | 2005137126 A | 5/2005 |

* cited by examiner

ELECTRICAL MOTOR

TECHNICAL FIELD

The present invention relates to an electrical motor, and especially to an electrical motor for use in vehicles, for example as a motor generator unit, a torque vectoring motor, or a drive motor. The present invention also relates to a method for manufacturing such electrical motor.

BACKGROUND

Electrical motors are currently used in a vast amount of applications. In the automotive industry electrical motors may e.g. be used as starters/generators, for example as so called integrated motor generator units, as drive motors in hybrid drive vehicles or purely electrical vehicles, or as torque vectoring motors.

As the interest for electrical motors increases, it is important to provide improved processes for manufacturing as well as novel technical configurations for improving the performance of the electrical motor.

SUMMARY

In view of the foregoing, an object of the present invention is to reduce the drawbacks of prior art electrical motors and methods for manufacturing such.

According to a first aspect, an electrical motor is provided in accordance with claim 1. According to a second aspect, a method for manufacturing an electrical motor is provided in accordance with claim 8.

Preferred embodiments are disclosed in the appended dependent claims.

BRIEF DESCRIPTION OF THE DRAWINGS

Embodiments of the present invention will be described in the following, reference being made to the appended drawings, wherein.

DETAILED DESCRIPTION

Figure 1A:
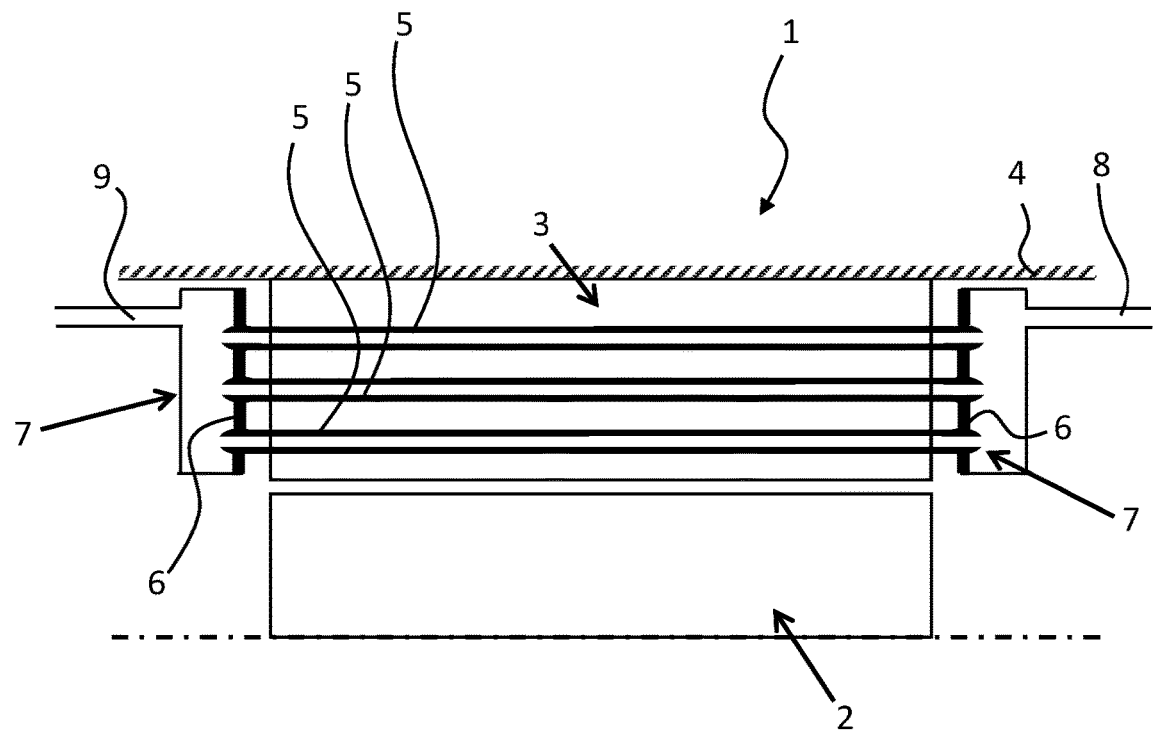
FIGS. 1a-b are cross-sectional views of an electrical motor according to two different embodiments.
Figure 1B:
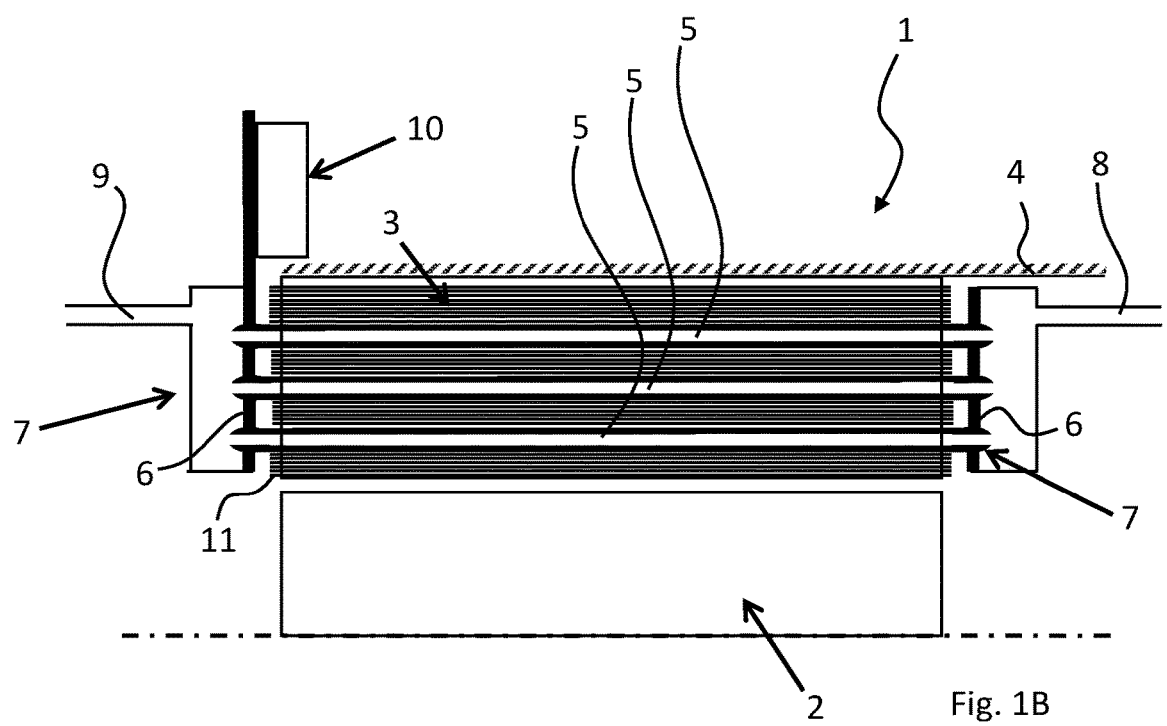

In FIGS. 1a-b, an electrical motor 1 is shown. The electrical motor 1 comprises a rotor 2, a stator 3 including coils 11, and a housing 4 enclosing the rotor 2 and the stator 3. The stator is provided with a plurality of winding pins 5 arranged at different radius, and being distributed circumferentially.

The housing 4 may be any enclosure suitable for protecting the rotor 2 and the stator 3. The housing 4 may completely or partially enclose the rotor 2 and the stator 3 and may be of any suitable shape. The housing 4 may be adapted to be electromagnetically shielding, impact resistant and/or waterproof. The housing 4 may further be adapted to rotationally support the rotor 2.

The winding pins 5 preferably have parallel walls that may or may not comprise folds, grooves and/or bends. The winding pins 5 are preferably parallel to each other. They may have any cross-sectional shape such as rectangular, circular or triangular and preferably but not necessarily have the same shape along the entire length of the winding pins 5. The radius of the winding pins 5 may be constant or increase along the entire length of the winding pins 5. The winding pins 5 are preferably made from a waterproof material such as plastic. The shape, length, radius and/or material may be the same, similar or different for each of said plurality of winding pins 5.

Each axial stator end is provided with an end turn connection device 6. The end turn connection device 6 may e.g. be realized as a printed circuit board (PCB), a bus-bar assembly or similar planar structure comprising all connections between the windings. The metal connections may preferably be embedded in plastic material. In case of PCB, IMS (insulated metal substrate) may be advantageous. Each end turn connection device 6 is preferably arranged on a cover 7, which may be formed by e.g. a plastic material. One cover 7 is provided with an oil inlet 8, while the other cover 7 is provided with an oil outlet 9. Each cover 7 is preferably adapted to protect the end turn connection devices 6 from liquids. Thusly, the cover 7 is preferably made from a waterproof material such as plastic.

In order to allow cooling oil to flow from the inlet 8 to the outlet 9, at least some of the winding pins 5 are hollow. The inner diameter of the winding pins 5 may be constant or increase along the entire length of the winding pins 5 and may be the same, similar or different for each of said plurality of winding pins 5. Further, the hollow winding pins 5 are preferably inserted through each end turn connection device 6, preferably by means of a press fit, welding, brazing or soldering. Oil entering the inlet 8 thus flows into the cover 7, and further into the winding pins 5 without coming into contact with the end turn connection device 6. The oil flows through the winding pins 5 across the axial length of the stator 3, into the opposite cover 7 and exits at the oil outlet 9 without coming into contact with the end turn connection device 6.

Optionally, at least one of the end turn connection devices 6 may be provided with an electronics module 10, such as a power module or other discrete power component. The electronics module 10 may be arranged on the end turn connection device 6 but radially outside the stator 3 (see FIG. 1b).

Figure 2:
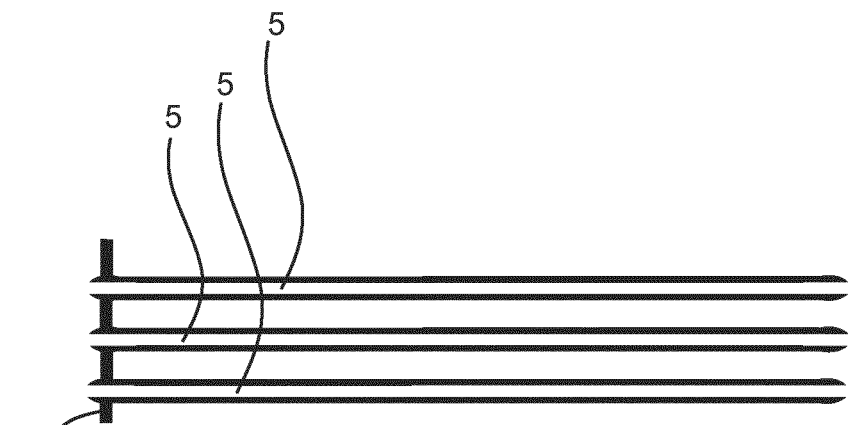
FIGS. 2-4 are cross-sectional view of an electrical motor during subsequent manufacturing steps, according to an embodiment.
Figure 3:
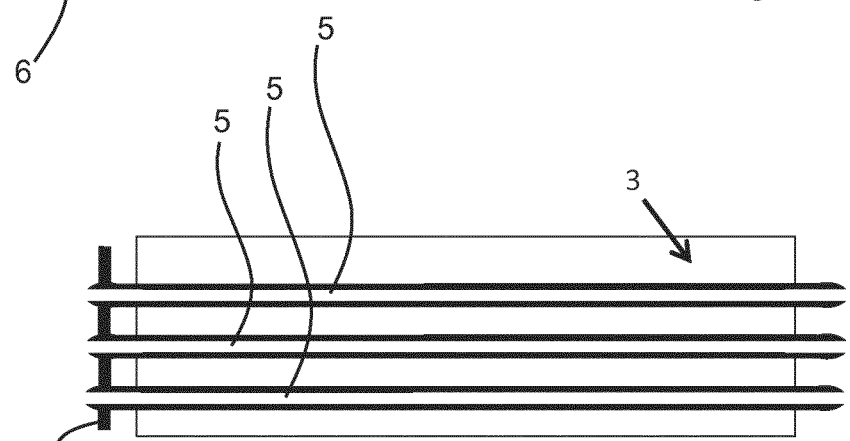
Figure 4:
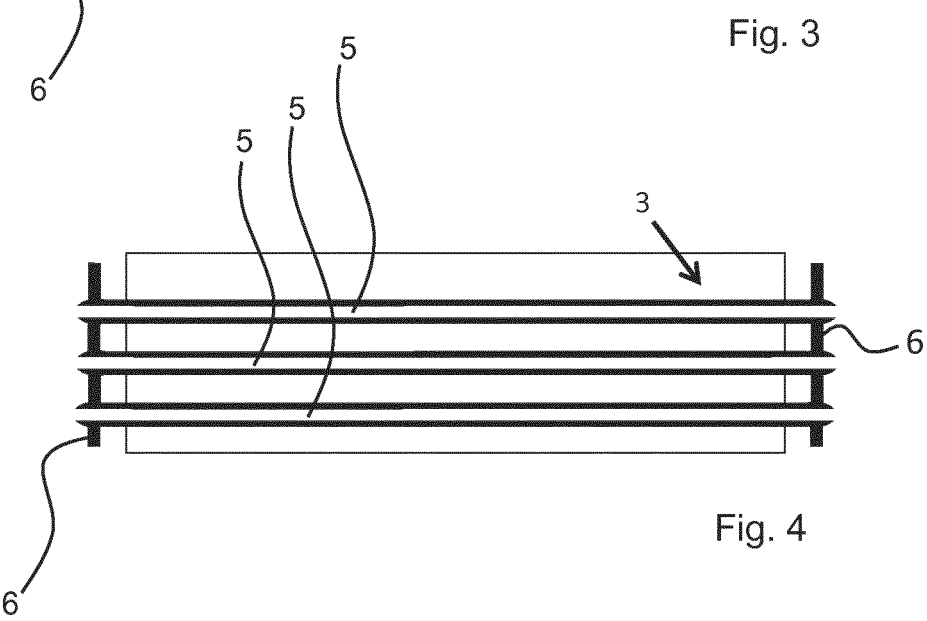

Manufacturing of the electrical motor will now be described with reference to FIGS. 2-4. In FIG. 2, the hollow winding pins 5 are press-fitted onto an end turn connection device 6. The winding pins 5 may optionally further be fastened using heat processing or adhesives. In FIG. 3, the stator 3 is formed by providing coils around the winding pins 5. The coils may be formed by winding conducting material such as copper around the winding pins 5 or they may be pre-wound and placed around the winding pins 5. In FIG. 4, an additional end turn connection device 6 is press-fitted onto the free ends of the winding pins 5. The winding pins 5 may optionally further be fastened using heat processing or adhesives. As is evident, the electrical motor 1 may be manufactured by additional steps of arranging the covers 7, and by positioning the stator 3 in a housing 4 with an associated rotor 2.

The electrical motor 1 described herein provides a number of advantages. It allows for a simplified stator assembly process. It is possible to use only one type of winding pin per motor, which thereby is scalable in length. It allows for flexible winding patterns, such as for updated end turn connection device routing. It also allows for excellent cooling, whereby continuous power will be equal to peak power if combined with rotor cooling. It also allows for shorter total stator length and decreased end turn length. It also allows for further potential to integrate power semiconductors on the end turn connection device, as well as decreased winding AC-losses, which leads to higher efficiency and a higher speed capability of the engine.

The invention claimed is:

1. An electrical motor, comprising a rotor, a stator, and a housing enclosing the rotor and the stator, wherein the stator comprises at least one end turn connection device arranged on one axial end thereof, and a plurality of hollow winding pins extending through the at least one end turn connection device with conductive material wound around the plurality of hollow winding pins to form coils, wherein the at least one end turn connection device comprises a printed circuit board or a bus-bar assembly and wherein the at least one end turn connection device comprises all electrical connections between the coils.

2. The electrical motor according to claim 1, wherein the stator comprises two end turn connection devices arranged on respective axial ends thereof, and wherein the plurality of hollow winding pins extend through both of the two end turn connection devices.

3. The electrical motor according to claim 1, wherein at least a portion of the plurality hollow winding pins are positioned at different radial distances from a central axis of the electrical motor.

4. The electrical motor according to claim 1, further comprising an oil inlet arranged at the at least one end turn connection device and configured to allow cooling oil to flow into the plurality of hollow winding pins without contacting the at least one end turn connection device.

5. The electrical motor according to claim 4, further comprising an oil outlet arranged at the at least one end turn connection device positioned on an opposite end of said oil inlet, wherein the oil outlet is configured to allow cooling oil to flow out from the plurality of hollow winding pins without contacting the at least one end turn connection device.

6. The electrical motor according to claim 4, wherein the oil inlet and/or an oil outlet are formed as respective covers for the end turn connection devices.

7. The electrical motor according to claim 1, wherein the plurality of hollow winding pins are press-fitted onto the at least one end turn connection device.

8. The electrical motor according to claim 1, further comprising an electronics module.

9. A method for manufacturing an electrical motor, comprising arranging a rotor and a stator within a housing, wherein the stator is provided by:
   press-fitting a plurality of hollow winding pins onto at least one end turn connection device, and
   winding conductive material around the plurality of hollow winding pins to form coils around the plurality of hollow winding pins,
   wherein the at least one end turn connection device comprises a printed circuit board or a bus-bar assembly and comprises all electrical connections between the coils.

10. The method according to claim 9, further comprising a step of press-fitting an additional end turn connection device onto free ends of said plurality of hollow winding pins after forming the coils around the plurality of hollow winding pins.

11. The method according to claim 9, wherein at least a portion of the plurality hollow winding pins are positioned at different radial distances from a central axis of the electrical motor.

12. The electrical motor according to claim 8, wherein the electronics module is positioned radially outside of the stator.

\* \* \* \* \*